United States Patent
Awaloeddin et al.

(10) Patent No.: US 9,912,272 B2
(45) Date of Patent: Mar. 6, 2018

(54) CONTROL DEVICE, CONTROL METHOD OF SECONDARY EXCITATION DEVICE, AND VARIABLE SPEED PUMPED-STORAGE GENERATING SYSTEM

(71) Applicant: Kabushiki Kaisha Toshiba, Minato-ku (JP)

(72) Inventors: Ryan Triadhitama Bin Marwan Awaloeddin, Yokohama (JP); Kiyoshi Kusunoki, Kawasaki (JP); Kentaro Kinoshita, Tokyo (JP); Hiroyuki Kikuchi, Sagamihara (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/193,509

(22) Filed: Jun. 27, 2016

(65) Prior Publication Data
US 2017/0012561 A1 Jan. 12, 2017

(30) Foreign Application Priority Data
Jul. 8, 2015 (JP) ................................. 2015-136637

(51) Int. Cl.
| H02P 1/00 | (2006.01) |
| H04L 27/00 | (2006.01) |
| H02P 9/00 | (2006.01) |
| H02M 1/12 | (2006.01) |

(52) U.S. Cl.
CPC .............. *H02P 9/007* (2013.01); *H02M 1/12* (2013.01); *Y02E 60/17* (2013.01)

(58) Field of Classification Search
None
See application file for complete search history.

(56) References Cited

U.S. PATENT DOCUMENTS

2008/0089444 A1* 4/2008 Shin ..................... H02M 1/12
375/326

FOREIGN PATENT DOCUMENTS

| CA | 2056316 A1 | 5/1992 |
| DE | 102 59 068 A1 | 7/2004 |
| DE | 10 2012 108 164 A1 | 3/2014 |
| JP | 4-200299 | 7/1992 |
| JP | 2014-168332 | 9/2014 |

OTHER PUBLICATIONS

Office Action dated Sep. 1, 2016 in German Patent Application No. 10 2016 008 138.4 (with English language translation).

* cited by examiner

*Primary Examiner* — Bentsu Ro
*Assistant Examiner* — Zemenay Truneh
(74) *Attorney, Agent, or Firm* — Oblon, McClelland, Maier & Neustadt, L.L.P.

(57) ABSTRACT

According to one embodiment, there is provided a control device of a secondary excitation device which supplies a rotary machine with a voltage or current of a variable frequency. The control device includes a harmonic frequency calculation unit which calculates a frequency of a specific harmonic generated on a primary side of the rotary machine by using a slip frequency or rotation speed of the rotary machine and a carrier frequency of the secondary excitation device, and a carrier frequency correction unit which corrects the carrier frequency of the secondary excitation device such that the frequency of the specific harmonic calculated by the harmonic frequency calculation unit falls within a given band.

18 Claims, 3 Drawing Sheets

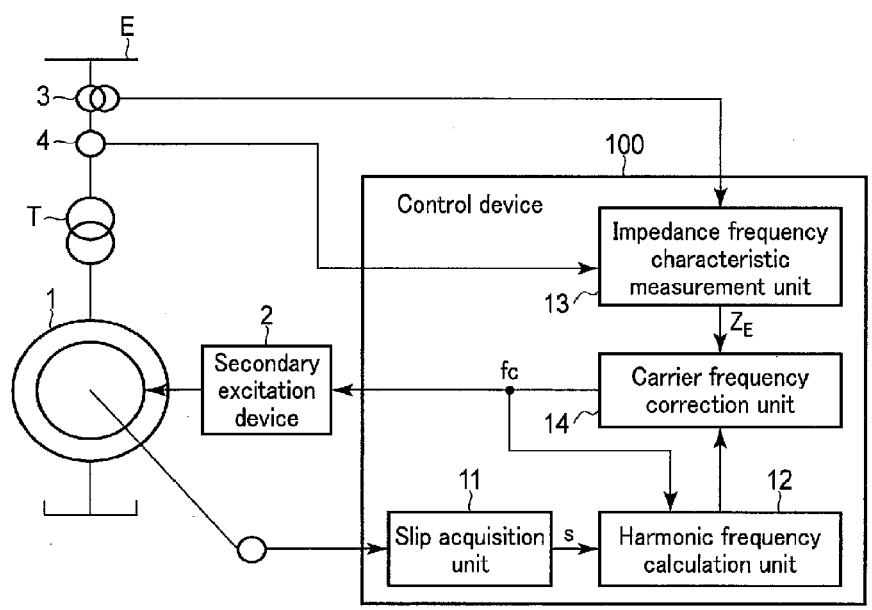
F I G. 1

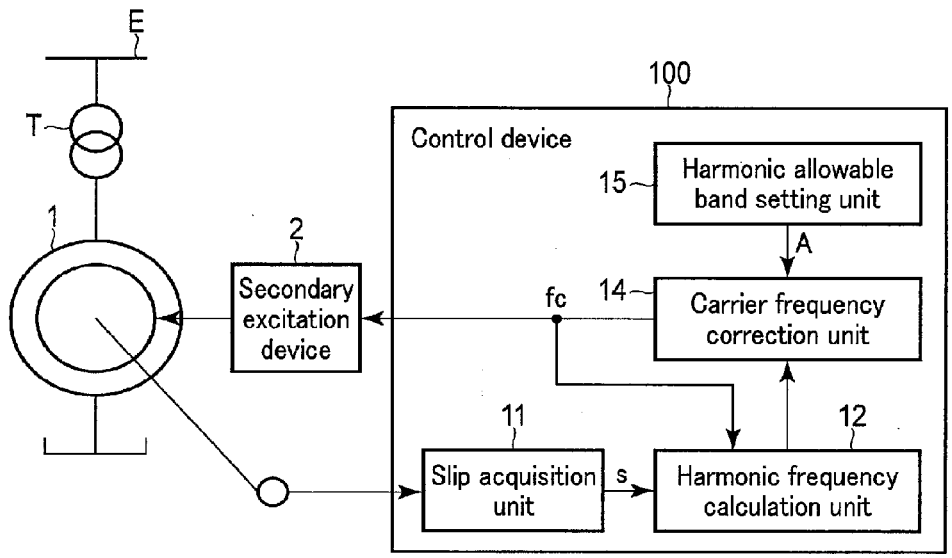
F I G. 4
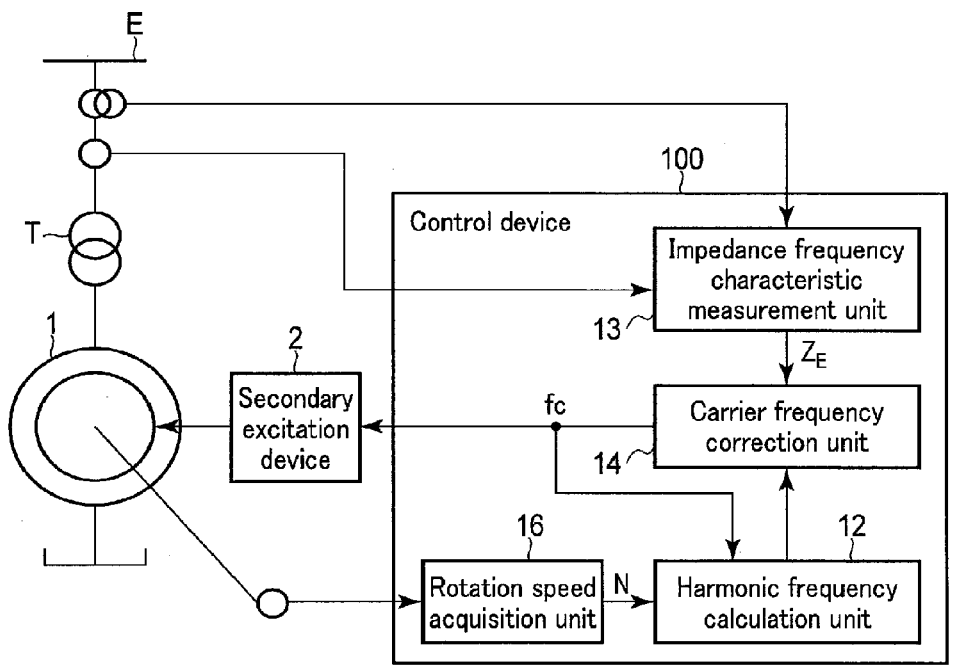
F I G. 5

CONTROL DEVICE, CONTROL METHOD OF SECONDARY EXCITATION DEVICE, AND VARIABLE SPEED PUMPED-STORAGE GENERATING SYSTEM

CROSS-REFERENCE TO RELATED APPLICATIONS

This application is based upon and claims the benefit of priority from Japanese Patent Application No. 2015-136637, filed Jul. 8, 2015, the entire contents of which are incorporated herein by reference.

FIELD

Embodiments of the present invention relate to a control device, control method of a secondary excitation device, and a variable speed pumped-storage power generating system.

BACKGROUND

A variable speed pumped-storage power generating system employs a secondary excitation device which generates a revolving field by supplying a rotator with a three-phase AC to control a rotation speed of a generator motor.

The secondary excitation device performs PWM control to superimpose, on a carrier, the signal wave desired to be generated, and performs switching between semiconductor elements at intersection points of the carrier and the signal wave to generate a target voltage.

Harmonic components of the carrier frequency used in the PWM control inevitably cause a voltage distortion factor on the primary side of the generator motor. A technique of detecting a voltage distortion factor and controlling a carrier frequency to reduce a voltage distortion factor caused by harmonic components of the carrier frequency has been known.

In contrast, in a variable speed pumped-storage power generating system, harmonics generated on the primary side of a generator motor increase as the impedance frequency characteristic of the electric power system changes. More specifically, when an antiresonance is caused between a harmonic peak frequency which flows out of the generator motor and an impedance of the electric power system viewed from the generator motor, a problem arises in which the harmonic voltage distortion factor of the electric power system increases.

Under the circumstances, it is desired to provide a control device, control method of a secondary excitation device, and a variable speed pumped-storage power generating system, capable of reducing the harmonic voltage distortion factor of an electric power system and a variable speed pumped-storage power generating system.

BRIEF DESCRIPTION OF THE DRAWINGS

FIG. 1 is a schematic diagram showing an example of the configuration of a variable speed pumped-storage power generating system of a secondary excitation type according to a first embodiment;

FIG. 4 is a schematic diagram showing an example of the configuration of a variable speed pumped-storage power generating system of a secondary excitation type according to a second embodiment; and FIG. 5 is a schematic diagram showing an example of the configuration of a variable speed pumped-storage power generating system of a secondary excitation type according to a third embodiment.

DETAILED DESCRIPTION

Figure 2:
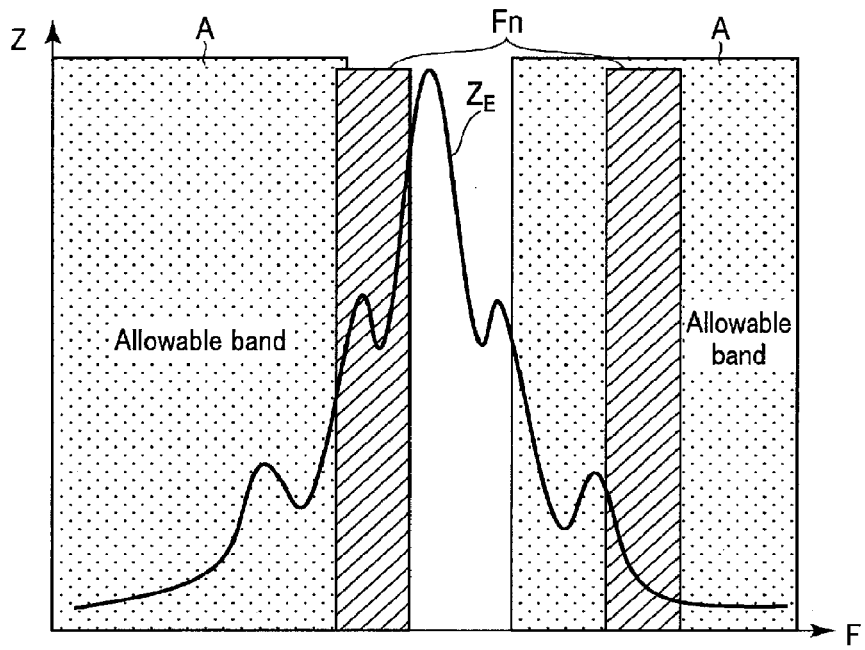
FIG. 2 is a conceptual diagram showing an example of the state of an n-th harmonic frequency $F_n$ before a carrier frequency $f_c$ is corrected.

Hereinafter, embodiments will be described with reference to the accompanying drawings.

In general, according to one embodiment, there is provided a control device of a secondary excitation device which supplies a rotary machine with a voltage or current of a variable frequency. The control device includes a harmonic frequency calculation unit which calculates a frequency of a specific harmonic generated on a primary side of the rotary machine by using a slip frequency or rotation speed of the rotary machine and a carrier frequency of the secondary excitation device, and a carrier frequency correction unit which corrects the carrier frequency of the secondary excitation device such that the frequency of the specific harmonic calculated by the harmonic frequency calculation unit falls within a given band.

(First Embodiment)

The first embodiment will be described with reference to FIGS. 1 to 3.

FIG. 1 is an exemplary schematic diagram of a variable speed pumped-storage power generating system of a secondary excitation type according to the first embodiment.

The variable speed pumped-storage power generating system comprises, as main structural elements; a duplex feeding generator motor (hereinafter referred to as "generator motor") 1, which is a rotary machine connected to an electric power system E via a transformer T; a secondary excitation device 2 which supplies a voltage or current of a variable frequency to a secondary side of the generator motor 1; and a control device 100 which controls a carrier frequency $f_c$ of a frequency converter in the secondary excitation device 2 based on various types of information. The variable speed pumped-storage power generating system also comprises a voltage measurement unit 3 and a current measurement unit 4 which respectively measure a voltage and a current on the electric power system E side. Measurement results of the voltage measurement unit 3 and current measurement unit 4 are sent to the control device 100.

The control device 100 comprises a slip acquisition unit 11, a harmonic frequency calculation unit 12, an impedance frequency characteristic measurement unit 13, a carrier frequency correction unit 14, and the like.

The slip acquisition unit 11 acquires, from the generator motor 1, information indicating a slip s of the generator motor 1. The slip s can be obtained, for example, based on a measured rotation speed N (or rotation number) of a rotator of the generator motor 1 and a preset reference rotation speed (or reference rotation number) $N_0$ by using the formula "$s=(N_0-N)/N_0$."

The harmonic frequency calculation unit 12 obtains a slip frequency $f_s$ based on the slip s of the generator motor 1 acquired by the slip acquisition unit 11 and the commercial frequency, and calculates a frequency of a specific harmonic generated on the primary side of the generator motor 1 by using the slip frequency $f_s$ and the carrier frequency $f_c$ of the secondary excitation device 2. The slip frequency $f_s$ can be obtained, for example, based on the slip s of the generator motor 1 obtained by the slip acquisition unit 11 and the reference frequency (commercial frequency) $f_0$ by using the formula "$F_n = s \times f_0$," where the specific harmonic frequency is expressed as n-th harmonic frequency $F_n$ (where n is one of 1, 2, 3, . . . ). Assumed in the present embodiment is the case where a first harmonic frequency is used; however, the specific harmonic frequency is not limited to the first harmonic frequency.

Specifically, the harmonic frequency calculation unit 12 calculates the n-th harmonic frequency $F_n$ generated on the primary side of the generator motor 1 by using the following formula (1):

$$F_n = (a \times f_c) \pm f_0 \pm (k_n \times f_s) \qquad (1)$$

where $F_n$ is an n-th harmonic frequency,
a is a constant,
$f_c$ is a carrier frequency,
$f_0$ is a commercial frequency,
$k_n$ is a coefficient of a sideband wave of the n-th harmonic component according to the carrier frequency, and
$f_s$ is a slip frequency.

The impedance frequency characteristic measurement unit 13 measures an impedance frequency characteristic $Z_E$ of the electric power system E from the voltage measured by the voltage measurement unit 3 and the current measured by the current measurement unit 4.

The carrier frequency correction unit 14 corrects the carrier frequency $f_c$ of the secondary excitation device 2 such that the frequency of the specific harmonic (n-th harmonic frequency $F_n$) calculated by the harmonic frequency calculation unit 12 falls within a predetermined allowable band A determined in accordance with the impedance frequency characteristic $Z_E$ measured by the impedance frequency characteristic measurement unit 13. The allowable band A is a region for suppressing generation of an antiresonance between the harmonic peak frequency, which flows out of the generator motor 1, and an impedance of the electric power system E viewed from the generator motor 1 while allowing generation of the specific harmonic component (n-th harmonic component) of less than a given degree.

With such a configuration, the control device 100 uses the various functions of the slip acquisition unit 11, the harmonic frequency calculation unit 12, the impedance frequency characteristic measurement unit 13, and the carrier frequency correction unit 14 to control the carrier frequency $f_c$ of the frequency converter in the secondary excitation device 2.

The harmonic frequency calculation unit 12 uses, for example, the carrier frequency $f_c$ set at the carrier frequency correction unit 14 and the slip s acquired by the slip acquisition unit 5 to calculate an n-th harmonic frequency generated by the generator motor 1, and passes the calculation result to the carrier frequency correction unit 14. The impedance frequency characteristic measurement unit 13 measures an impedance frequency characteristic $Z_E$ of the electric power system E from the voltage measured by the voltage measurement unit 3 and the current measured by the current measurement unit 4, and passes the measurement result to the carrier frequency correction unit 14. The carrier frequency correction unit 14 calculates a corrected carrier frequency f, or a correction value of the carrier frequency based on the n-th harmonic frequency calculated by the harmonic frequency calculation unit 12 and the impedance frequency characteristic $Z_E$ measured by the impedance frequency characteristic measurement unit 13, sends the calculation result to the secondary excitation device 2 as a command value, and sends the same information to the harmonic frequency calculation unit 12. FIG. 1 illustrates the case where the carrier frequency correction unit 14 outputs a corrected carrier frequency $f_c$ as the command value.

An example of the operation of the carrier frequency correction unit 14 will be described with reference to the conceptual diagrams of FIGS. 2 and 3. FIG. 2 shows an example of the state of the n-th harmonic frequency $F_n$ before the carrier frequency $f_c$ is corrected. FIG. 3 shows an example of the state of the n-th harmonic frequency $F_n$ after the carrier frequency $f_c$ is corrected.

The carrier frequency correction unit 14 confirms whether the n-th harmonic frequency $F_n$ calculated by the harmonic frequency calculation unit 12 falls within the predetermined allowable band A determined in accordance with the impedance frequency characteristic $Z_E$ measured by the impedance frequency characteristic measurement unit 13.

Figure 3:
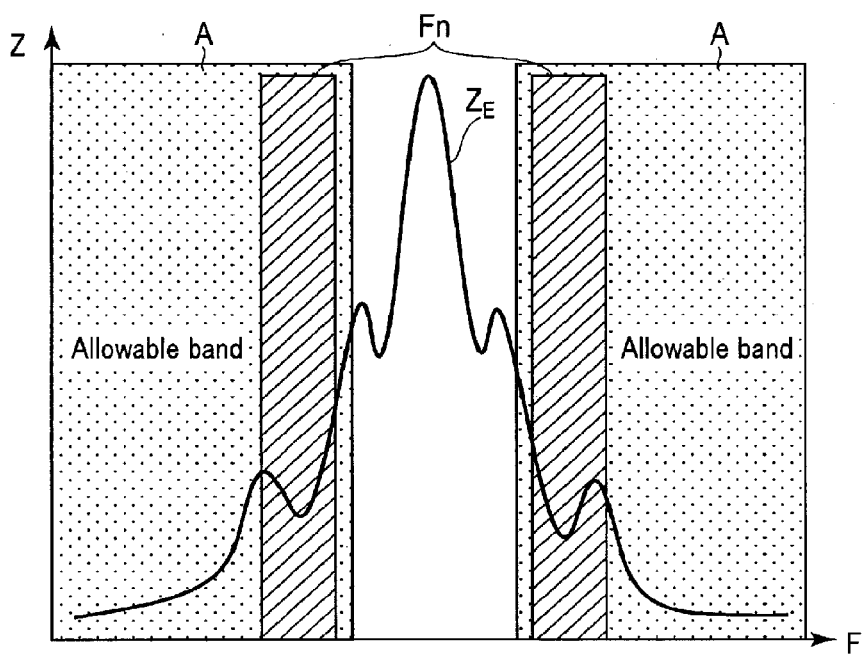
FIG. 3 is a conceptual diagram showing an example of the state of an n-th harmonic frequency $F_n$ after a carrier frequency $f_c$ is corrected.

Let us assume that the n-th harmonic frequency $F_n$ is in the state shown in FIG. 2. In this state, the n-th harmonic frequency $F_n$ generated on the primary side of the generator motor 1 is in a frequency band of a relatively high impedance in the impedance frequency characteristic $Z_E$ of the electric power system E, and an antiresonance is liable to occur between the harmonic peak frequency which flows out of the generator motor 1 and the impedance of the electric power system E viewed from the generator motor 1.

The carrier frequency correction unit 14 prevents the n-th harmonic frequency $F_n$ generated on the primary side of the generator motor 1 from residing in the band of relatively high impedance to suppress the antiresonance. In other words, the carrier frequency correction unit 14 corrects the carrier frequency $f_c$ of the transformer of the secondary excitation device 2 in accordance with formula (1) above, such that the n-th harmonic frequency $F_n$ generated on the primary side of the generator motor 1 resides in the allowable band A of relatively low impedance.

Even after such a correction, the carrier frequency correction unit 14 regularly confirms whether the n-th harmonic frequency $F_n$ resides in the allowable band A and, when the n-th harmonic frequency $F_n$ falls outside the allowable band A, corrects the carrier frequency $f_c$ of the transformer of the secondary excitation device 2 such that the n-th harmonic frequency $F_n$ falls in the allowable band A.

According to the first embodiment, use of the slip s of the operating generator motor 1 and the impedance frequency characteristic $Z_E$ of the electric power system E as information to be continuously or regularly input enables suppression of the antiresonance between the harmonic peak frequency which flows out of the generator motor 1 and the impedance of the electric power system E viewed from the generator motor 1, and enables reduction of the harmonic voltage distortion factor of the electric power system E.

Described in the present embodiment is the case where the impedance frequency characteristic of the "electric power system E" is used to determine the allowable band A, but information used for the determination is not limited to this. Alternatively, the impedance frequency characteristic of a "circuit connected to the electric power system E" may be used, or both of the impedance frequency characteristic of the "electric power system E" and that of the "circuit connected to the electric power system E" may be used.

Alternatively, the impedance ratio between the "impedance frequency characteristic of the electric power system E or a circuit connected to the electric power system E" and the "impedance frequency characteristic of the generator motor 1" (impedance frequency characteristic viewed from the generator motor 1) may be used. In this case, a second impedance frequency characteristic measurement unit 13' (not shown) for measuring the impedance frequency characteristic of the generator motor 1 is additionally provided to the configuration of FIG. 1, and the carrier frequency correction unit 14 obtains the ratio (impedance ratio) between the impedance frequency characteristic measured by the impedance characteristic measurement unit 13 and the impedance frequency characteristic measured by the second impedance characteristic measurement unit 13'. At that time, the carrier frequency correction unit 14 corrects the carrier frequency $f_c$ of the secondary excitation device 2 such that the n-th harmonic frequency $F_n$ calculated by the harmonic frequency calculation unit 12 falls within the predetermined allowable band A determined in accordance with, the obtained impedance ratio.

Described in the present embodiment is the case where the "impedance frequency characteristic" of the electric power system E is used to determine the allowable band A, but the information used for the determination is not limited to the "impedance frequency characteristic" and may be "various electric amounts related to the impedance frequency characteristic." For example, an "electrical quantity from which an impedance frequency characteristic can be calculated" or an "electrical quantity from which an electrical quantity equivalent to the impedance frequency characteristic" may be used, instead of the "impedance frequency characteristic." Alternatively, a combination of that information may be used.

The "electrical quantity from which an impedance frequency characteristic can be calculated" is, for example, a voltage and a current. The impedance (Z), voltage (V), and current (I) have the following relationship:

$$Z=V/I, I=V/Z, \text{ and } V=I \times Z$$

Accordingly, an "impedance frequency characteristic" can be obtained from a voltage and a current.

The "electrical quantity equivalent to the impedance frequency characteristic" is, for example, a voltage. When the current is fixed, the frequency characteristic of the voltage is equivalent to the frequency characteristic of an impedance.

Therefore, the "impedance frequency characteristic" of the electric power system E can be obtained by supplying the electric power system E with constant currents of different frequencies to obtain voltages for different frequencies.

The impedance ratio (e.g., Z1/Z2) is obtained from the measured results by using the following formula:

$$Z1/Z2=V1/V2 \ (I1=I2=\text{constant})$$

Accordingly, an impedance ratio (impedance frequency characteristic viewed from the generator motor 1) can be obtained from a voltage and a current.

(Second Embodiment)

The second embodiment will be described with reference to FIG. 4. The same elements as those described in the first embodiment (FIGS. 1 to 3) are assigned with the same reference numerals, and redundant descriptions are omitted. In the following, mainly those sections different from the first embodiment will be described.

FIG. 4 is a schematic diagram showing an example of the configuration of a variable speed pumped-storage power generating system of a secondary excitation type according to the second embodiment.

In the second embodiment, unlike in the first embodiment, a harmonic allowable band setting unit 15 is provided instead of the impedance frequency characteristic measurement unit 13.

The harmonic allowable band setting unit 15 sets the allowable band A in advance. As described above, the allowable band A is a region for suppressing generation of an antiresonance between the harmonic peak frequency which flows out of the generator motor 1 and the impedance of the electric power system E viewed from the generator motor 1 while allowing generation of the specific harmonic component (n-th harmonic component) of less than a given degree.

The carrier frequency correction unit 14 corrects the carrier frequency $f_c$ of the secondary excitation device 2 such that the n-th harmonic frequency $F_n$ calculated by the harmonic frequency calculation unit 12 falls within the allowable band A set by the harmonic allowable band setting unit 15.

According to the second embodiment, mere use of the slip s of the operating generator motor 1 as information to be continuously or regularly input enables suppression of the antiresonance between the harmonic peak frequency which flows out of the generator motor 1 and the impedance of the electric power system E viewed from the generator motor 1, and enables reduction of the harmonic voltage distortion factor of the electric power system E.

(Third Embodiment)

The third embodiment will be described with reference to FIG. 5. The same elements as those described in the first embodiment (FIGS. 1 to 3) are assigned with the same reference numerals, and redundant descriptions are omitted. In the following, mainly those sections different from the first embodiment will be described.

FIG. 5 is a schematic diagram showing an example of the configuration of a variable speed pumped-storage power generating system of a secondary excitation type according to the third embodiment.

In the third embodiment, unlike in the first embodiment, a rotation speed acquisition unit 16 is provided instead of the slip acquisition unit 11.

The rotation speed acquisition unit 16 acquires, from the generator motor 1, information indicating a rotation speed N (or rotation number) of the rotator of the generator motor 1. The harmonic frequency calculation unit 12 uses the rotation speed N of the generator motor 1 acquired by the rotation speed acquisition unit 16 and the carrier frequency $f_c$ of the secondary excitation device 2 to calculate the n-th harmonic frequency $F_n$ generated on the primary side of the generator motor 1.

Specifically, the harmonic frequency calculation unit 12 calculates the n-th harmonic frequency $F_n$ generated on the primary side of the generator motor 1 by using the following formula (2):

$$F_n=(a \times f_c) \pm f_0 \pm [k_n \times \{f_0-(N \cdot P/120)\}] \tag{2}$$

where $F_n$ is an n-th harmonic frequency
a is a constant,
$f_c$ is a carrier frequency,
$f_0$ is a commercial frequency,
$k_n$ is a coefficient of a sideband wave of the n-th harmonic component according to the carrier frequency,
N is a rotation speed of the rotator, and
P is the number of magnetic poles of the rotator.

According to the third embodiment, use of the rotation speed N of the rotator of the operating generator motor 1 and the impedance frequency characteristic $Z_E$ of the electric power system E as information to be continuously or regularly input enables suppression of the antiresonance between the harmonic peak frequency which flows out of the generator motor 1 and the impedance of the electric power system E viewed from the generator motor 1, and enables reduction of the harmonic voltage distortion factor of the electric power system E.

In the present embodiment, the case where the impedance frequency characteristic measurement unit 13 is provided as in the first embodiment is described as an example; however, the configuration is not limited to this. As described in the second embodiment, the harmonic allowable band setting unit 15 may be provided instead of the impedance frequency characteristic measurement unit 13. In that case, mere use of the rotation speed N (or rotation number) of the rotator of the operating generator motor 1 as information to be continuously or regularly input enables suppression of the antiresonance between the harmonic peak frequency which flows out of the generator motor 1 and the impedance of the electric power system E viewed from the generator motor 1, and reduction of the harmonic voltage distortion factor of the electric power system E.

As described above in detail, according to the embodiments, it is possible to reduce the harmonic voltage distortion of an electric power system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope of the inventions.

The invention claimed is:

1. A control device of a secondary excitation device which supplies a rotary machine with a voltage or current of a variable frequency, the control device comprising:
    a slip acquisition unit which acquires a slip of the rotary machine;
    a harmonic frequency calculation unit which obtains a slip frequency based on at least a commercial frequency and the slip acquired by the slip acquisition unit, and calculates a frequency of a specific harmonic generated on a primary side of the rotary machine by using the slip frequency and a carrier frequency of the secondary excitation device; and
    a carrier frequency correction unit which corrects the carrier frequency of the secondary excitation device such that the frequency of the specific harmonic calculated by the harmonic frequency calculation unit falls within a given band.

2. The control device according to claim 1, further comprising:
    an information acquisition unit which acquires an impedance frequency characteristic of an electric power system or a circuit connected to the electric power system, or an electrical amount related to the impedance frequency characteristic, wherein
    the carrier frequency correction unit corrects the carrier frequency of the secondary excitation device such that the frequency of the specific harmonic falls within a predetermined band determined in accordance with a result acquired by the information acquisition unit.

3. The control device according to claim 1, further comprising:
    an impedance characteristic measurement unit which measures an impedance frequency characteristic of an electric power system or a circuit connected to the electric power system,
    wherein the carrier frequency correction unit corrects the carrier frequency of the secondary excitation device such that the frequency of the specific harmonic calculated by the harmonic frequency calculation unit falls within a predetermined band determined in accordance with the impedance frequency characteristic measured by the impedance frequency characteristic measurement unit.

4. The control device according to claim 1, further comprising:
    a first impedance frequency characteristic measurement unit which measures an impedance frequency characteristic of an electric power system or a circuit connected to the electric power system; and
    a second impedance frequency characteristic measurement unit which measures an impedance frequency characteristic of the rotary machine,
    wherein the carrier frequency correction unit corrects the carrier frequency of the secondary excitation device such that the frequency of the specific harmonic calculated by the harmonic frequency calculation unit falls within a predetermined band determined in accordance with a ratio between the impedance frequency characteristic measured by the first impedance frequency characteristic measurement unit and the impedance frequency characteristic measured by the second impedance frequency characteristic measurement unit.

5. The control device according to claim 1, further comprising:
    a harmonic allowable band setting unit which sets an allowable band allowing generation of the specific harmonic,
    wherein the carrier frequency correction unit corrects the carrier frequency of the secondary excitation device such that the frequency of the specific harmonic calculated by the harmonic frequency calculation unit falls within an allowable band set by the harmonic allowable band setting unit.

6. The control device according to claim 1, wherein the harmonic frequency calculation unit calculates the frequency of the specific harmonic generated on the primary side of the rotary machine based on a following formula:

$$F_n = (a \times f_c) \pm f_0 \pm (k_n \times f_s)$$

where $F_n$ is an n-th harmonic frequency,
a is a constant,
$f_c$ is the carrier frequency,
$f_0$ is the commercial frequency,
$k_n$ is a coefficient of a sideband wave of the n-th harmonic component according to the carrier frequency, and
$f_s$ is the slip frequency.

7. The control device according to claim 1, wherein the harmonic frequency calculation unit calculates the frequency of the specific harmonic generated on the primary side of the rotary machine based on a following formula:

$$F_n = (a \times f_c) \pm f_0 \pm [k_n \times \{f_0 - (N \cdot P/120)\}]$$

where $F_n$ is an n-th harmonic frequency,
a is a constant,
$f_c$ is the carrier frequency, $f_0$ is the commercial frequency, $k_n$ is a coefficient of a sideband wave of the n-th harmonic component according to the carrier frequency, N is the rotation speed of the rotator, and P is a number of magnetic poles of the rotator.

8. A variable speed pumped-storage power generating system comprising the control device according to claim 1.

9. A control method of a secondary excitation device which supplies a rotary machine with a voltage or current of a variable frequency, the method comprising:

acquiring, by a slip acquisition unit, a slip of the rotary machine;

obtaining, by a harmonic frequency calculation unit, a slip frequency based on at least a commercial frequency and the slip acquired by the slip acquisition unit, and calculating, by the harmonic frequency calculation unit, a frequency of a specific harmonic generated on a primary side of the rotary machine by using the slip frequency and a carrier frequency of the secondary excitation device; and correcting, by a carrier frequency correction unit, the carrier frequency of the secondary excitation device such that the frequency of the specific harmonic calculated by the harmonic frequency calculation unit falls within a given band.

10. A control device of a secondary excitation device which supplies a rotary machine with a voltage or current of a variable frequency, the control device comprising:

a rotation speed acquisition unit which acquires a rotation speed of the rotary machine;

a harmonic frequency calculation unit which calculates a frequency of a specific harmonic generated on a primary side of the rotary machine by using at least the rotation speed acquired by the rotation speed acquisition unit and a carrier frequency of the secondary excitation device; and a carrier frequency correction unit which corrects the carrier frequency of the secondary excitation device such that the frequency of the specific harmonic calculated by the harmonic frequency calculation unit falls within a given band.

11. The control device according to claim 10, further comprising:

an information acquisition unit which acquires an impedance frequency characteristic of an electric power system or a circuit connected to the electric power system, or an electrical amount related to the impedance frequency characteristic, wherein the carrier frequency correction unit corrects the carrier frequency of the secondary excitation device such that the frequency of the specific harmonic falls within a predetermined band determined in accordance with a result acquired by the information acquisition unit.

12. The control device according to claim 10, further comprising:

an impedance characteristic measurement unit which measures an impedance frequency characteristic of an electric power system or a circuit connected to the electric power system, wherein the carrier frequency correction unit corrects the carrier frequency of the secondary excitation device such that the frequency of the specific harmonic calculated by the harmonic frequency calculation unit falls within a predetermined band determined in accordance with the impedance frequency characteristic measured by the impedance frequency characteristic measurement unit.

13. The control device according to claim 10, further comprising:

a first impedance frequency characteristic measurement unit which measures an impedance frequency characteristic of an electric power system or a circuit connected to the electric power system; and a second impedance frequency characteristic measurement unit which measures an impedance frequency characteristic of the rotary machine, wherein the carrier frequency correction unit corrects the carrier frequency of the secondary excitation device such that the frequency of the specific harmonic calculated by the harmonic frequency calculation unit falls within a predetermined band determined in accordance with a ratio between the impedance frequency characteristic measured by the first impedance frequency characteristic measurement unit and the impedance frequency characteristic measured by the second impedance frequency characteristic measurement unit.

14. The control device according to claim 10, further comprising:

a harmonic allowable band setting unit which sets an allowable band allowing generation of the specific harmonic, wherein the carrier frequency correction unit corrects the carrier frequency of the secondary excitation device such that the frequency of the specific harmonic calculated by the harmonic frequency calculation unit falls within an allowable band set by the harmonic allowable band setting unit.

15. The control device according to claim 10, wherein the harmonic frequency calculation unit calculates the frequency of the specific harmonic generated on the primary side of the rotary machine based on a following formula:

$$F_n = (a \times f_c) \pm f_{0\pm}(k_n \times f_s)$$

where $F_n$ is an n-th harmonic frequency, a is a constant, $f_c$ is the carrier frequency, $f_0$ is the commercial frequency, $k_n$ is a coefficient of a sideband wave of the n-th harmonic component according to the carrier frequency, and $f_s$ is the slip frequency.

16. The control device according to claim 10 wherein the harmonic frequency calculation unit calculates the frequency of the specific harmonic generated on the primary side of the rotary machine based on a following formula:

$$F_n = (a \times f_c) \pm f_0 \pm [k_n \times \{f_0 - (N \cdot P/120)\}]$$

where $F_n$ is an n-th harmonic frequency, a is a constant, $f_c$ is the carrier frequency, $f_0$ is the commercial frequency, $k_n$ is a coefficient of a sideband wave of the n-th harmonic component according to the carrier frequency, N is the rotation speed of the rotator, and P is a number of magnetic poles of the rotator.

17. A variable speed pumped-storage power generating system comprising the control device according to claim 10.

18. A control method of a secondary excitation device which supplies a rotary machine with a voltage or current of a variable frequency, the method comprising:

acquiring, by a rotation speed acquisition unit, a rotation speed of the rotary machine;

calculating, by a harmonic frequency calculation unit, a frequency of a specific harmonic generated on a primary side of the rotary machine by using at least the rotation speed acquired by the rotation speed acquisition unit and a carrier frequency of the secondary excitation device; and correcting, by a carrier frequency correction unit, the carrier frequency of the secondary excitation device such that the frequency of the specific harmonic calculated by the harmonic frequency calculation unit falls within a given band.

\* \* \* \* \*